United States Patent  
Yoon et al.

(10) Patent No.: US 8,289,495 B2
(45) Date of Patent: Oct. 16, 2012

(54) FILM PRINTING SYSTEM AND METHOD UTILIZING A DIGITAL LIGHT PROCESSING IMAGER OR ORGANIC LIGHT EMITTING DIODE

(75) Inventors: Youngshik Yoon, Valencia, CA (US); Mike Arthur Derrenberger, Hopkinton, MA (US); Ion Vizireanu, Westlake Village, CA (US); Gunther Karl Haas, St Gregoire (FR)

(73) Assignee: Thomson Licensing, Boulogne-Billancourt (FR)

( * ) Notice: Subject to any disclaimer, the term of this patent is extended or adjusted under 35 U.S.C. 154(b) by 163 days.

(21) Appl. No.: 12/448,865

(22) PCT Filed: Jan. 9, 2007

(86) PCT No.: PCT/US2007/000347
§ 371 (c)(1),
(2), (4) Date: Jul. 9, 2009

(87) PCT Pub. No.: WO2008/085159
PCT Pub. Date: Jul. 17, 2008

(65) Prior Publication Data
US 2010/0177291 A1  Jul. 15, 2010

(51) Int. Cl.
G03B 27/54 (2006.01)
G03B 31/00 (2006.01)
(52) U.S. Cl. .................. 352/44; 352/90
(58) Field of Classification Search .............. 355/32, 355/50, 67, 70, 71; 352/44, 48, 55, 90; 348/96, 348/97, 102, 105
See application file for complete search history.

(56) References Cited

U.S. PATENT DOCUMENTS

| 5,031,122 | A * | 7/1991 | Witty ................ 346/107.2 |
| 5,386,256 | A | 1/1995 | Taylor et al. |
| 6,118,556 | A | 9/2000 | Yamamoto et al. |
| 6,359,676 | B1 | 3/2002 | Treiber et al. |
| 6,624,949 | B2 * | 9/2003 | Roddy et al. ............ 359/634 |
| 6,727,974 | B2 | 4/2004 | Nishikawa |
| 6,930,797 | B2 * | 8/2005 | Ramanujan et al. ........ 358/1.2 |
| 6,952,684 | B2 | 10/2005 | Toshikage et al. |
| 7,023,463 | B2 * | 4/2006 | Ramanujan et al. ........ 347/239 |
| 7,170,632 | B1 | 1/2007 | Ninjo |
| 7,852,455 | B2 * | 12/2010 | Bjerkestrand ............... 352/6 |
| 7,907,249 | B2 * | 3/2011 | Anderle ................... 352/46 |
| 2003/0193556 | A1 * | 10/2003 | Druzynski et al. ......... 347/239 |
| 2004/0179088 | A1 * | 9/2004 | Wong et al. ............. 347/238 |
| 2004/0201864 | A1 | 10/2004 | Ramanujan |

(Continued)

FOREIGN PATENT DOCUMENTS

DE  10746224  5/1999

(Continued)

OTHER PUBLICATIONS

Supp European search.

(Continued)

*Primary Examiner* — William C Dowling
(74) *Attorney, Agent, or Firm* — Robert D. Shedd; Jeffrey M. Navon

(57) ABSTRACT

A motion picture printing system having a digital micromirror device for manipulating light used to expose a film negative is disclosed. A motion picture printing system having an organic light emitting diode for emitting light to expose a film negative is disclosed.

1 Claim, 9 Drawing Sheets

U.S. PATENT DOCUMENTS

2004/0223129 A1 11/2004 Ishikawa et al.
2007/0247591 A1* 10/2007 Shyu et al. ..................... 353/33

FOREIGN PATENT DOCUMENTS

| | | |
|---|---|---|
| DE | 19746224 | 5/1999 |
| EP | 1457346 | 9/2004 |
| JP | 2000066312 A | 3/2000 |
| JP | 2001250033 A | 9/2001 |
| JP | 2004310095 A | 4/2004 |

OTHER PUBLICATIONS

International Search Report, dated Oct. 5, 2007.

* cited by examiner

US 8,289,495 B2

FILM PRINTING SYSTEM AND METHOD UTILIZING A DIGITAL LIGHT PROCESSING IMAGER OR ORGANIC LIGHT EMITTING DIODE

This application claims the benefit, under 35 U.S.C. §365 of International Application PCT/US2007/00347 and filed Jan. 9, 2007, which was published in accordance with PCT Article 21(2) on Jul. 17, 2008, in English.

FIELD OF THE INVENTION

The invention relates to film printing technology for use with a digital light processing imager (DLP) or an organic light emitting diode (OLED).

BACKGROUND OF THE INVENTION

Continuous contact film printing systems are known and have been utilized in the motion picture industry. In its simplest form, continuous contact printing consists of exposing a raw stock of film from an original or printing master to form an image using a light source to produce the exposure. A schematic diagram of such a system is shown in FIG. 1 and will now be described. In the film printing system 10 shown here, a raw stock of film 12 is fed from a first feed reel 1 to a first take up reel 2. The reels 1 and 2 are driven by corresponding motors, $M_1$ and $M_2$. In between reels 1 and 2, the raw stock of film 12 is passed over a picture encoder $E_1$ and then a sound encoder $E_2$. Turning first to the picture encoder $E_1$, a light source, well-known as a light box 20 is coupled to a printing head 40 for exposing the raw stock of film 12 from an original 14 (positive film or master film) which is simultaneously fed from reel 3 to reel 4. Reels 3 and 4 are driven by corresponding motors $M_3$ and $M_4$. Light passes from the light box 20, through the print head 40, then through the original 14 to expose the raw stock of film 12, effectively transferring the image data contained on the original 14 to the raw stock of film 12. Since the light box 20 is well known in the industry, a detailed description will not be provided here. However, briefly, the light box 20 contains color separating optics, gates for controlling the color spectrum, collimating optics, and focusing optics at the output to printing head 40. The printing head 40 receives light from the focusing optics at the output of the light box 20 onto a folding mirror 42 which reflects the incident light through anamorphic optics 44. Light then passes from the anamorphic optics 44 through a film printing aperture 46 exposing the raw stock of film 12 through the original 14. Sound is then encoded onto the film 12 at the sound encoder $E_2$ utilizing known techniques which will not be described in further detail here.

Creating motion pictures for use in foreign markets requires subtitling to be applied during the film printing process. Application of the subtitles is known as a form of post production. Generally, in order to subtitle a film, a first original carrying the images and a second original carrying the subtitling or text are superimposed onto each other. In utilizing the known process described above to transfer the images and the subtitling to a single raw stock, a continuous contact film printing system is configured to allow the two originals to be simultaneously carried on reels 3 and 4 over the printing head 40. Because two originals are required, postproduction is cumbersome and costly. Additionally, the use of two originals in printing may hinder the ultimate picture quality of the printed film. Further, the above described process must be repeated for each separate language the film is to be subtitled, representing significant costs of time and labor. While it has been contemplated to use an LCD or and LCoS device to aid in the printing of images to film negative 12, these device tend to have low refresh rates (possibly slowing the printing process), lower contrast ratios, and are primarily electrical in construction (leading to high maintenance costs). It is therefore desirable to develop an improved system for printing the subtitle text onto the film 12.

SUMMARY OF THE INVENTION

The present invention is directed to an improved apparatus for printing subtitle text onto film.

An object of the present invention is to provide a system for and method of printing of subtitles onto raw film stock without the need for an original which carries the subtitles. The present invention satisfies this object by providing a film printing system comprising a DLP imager for transmitting subtitles through a positive or master film and onto a negative film stock.

Another object of the present invention is to provide a system for and method of directly printing subtitles to raw film stock without the need for an original master film or an original which carries subtitles. The present invention satisfies this object by providing a film printing system comprising a DLP imager for transmitting both, the motion picture image data and any optional subtitles, directly onto a negative film stock. The present invention further satisfies this object by providing a film printing system comprising an OLED device for transmitting both, the motion picture image data and any optional subtitles, directly onto a negative film stock.

The present invention offers at least the following advantages: offering high refresh rates (speeding up the printing process), higher contrast ratios, and inexpensive mechanical components (lowering maintenance costs).

DETAILED DESCRIPTION OF THE INVENTION

Figure 2A:
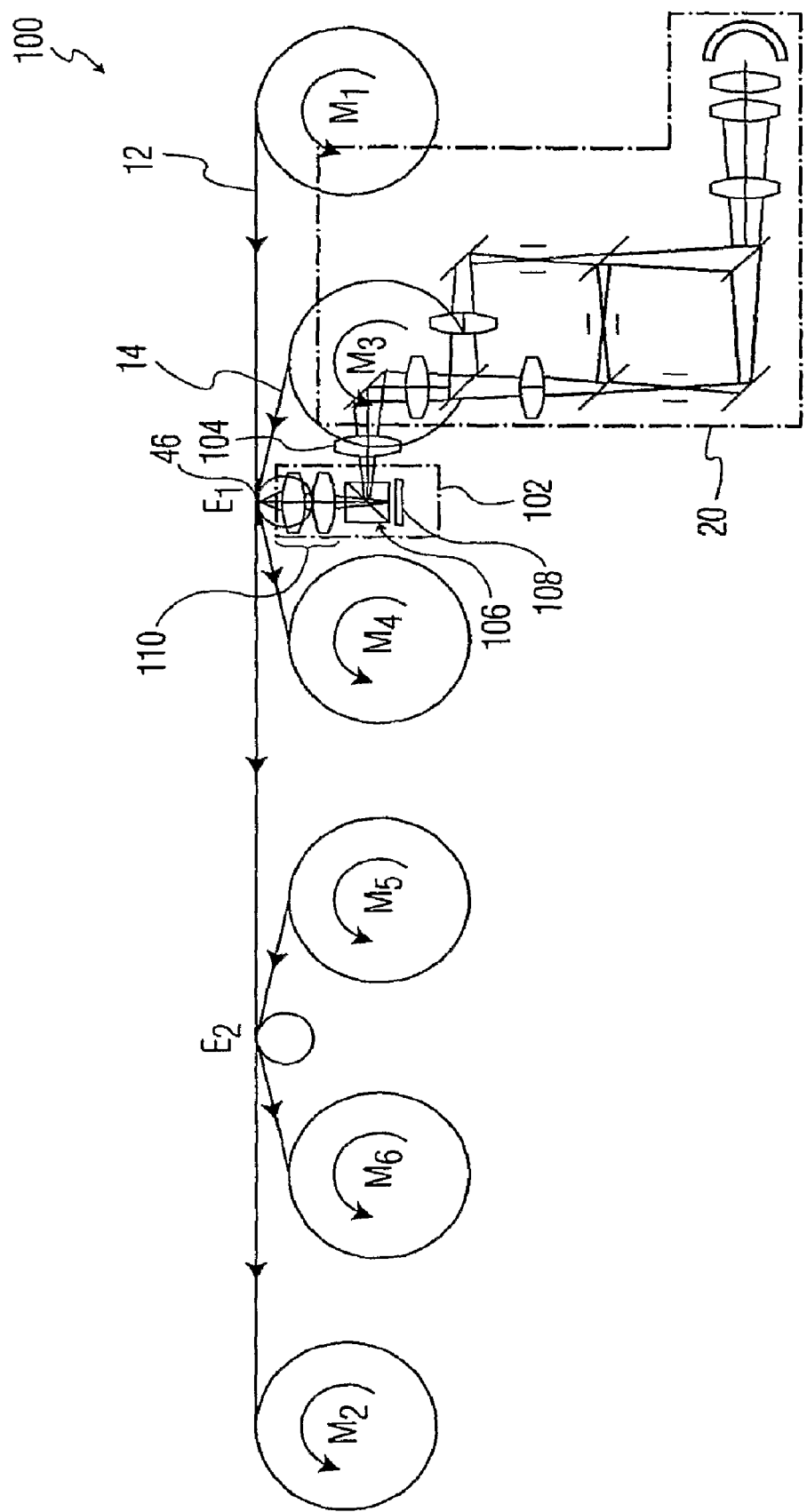
FIG. 2A is a schematic illustration of a film printing system according to a first embodiment of the present invention.
Figure 2B:
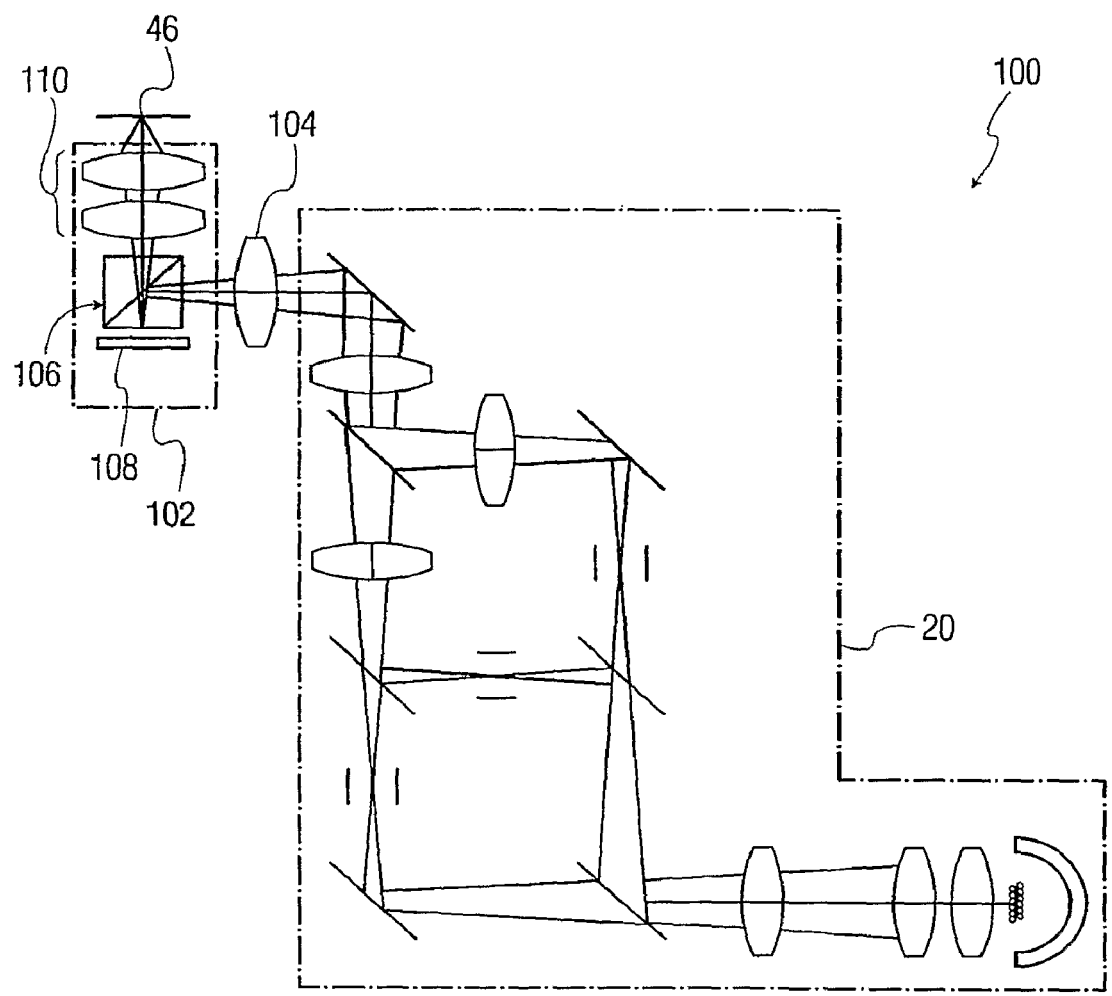
FIG. 2B is an enlarged schematic illustration of a portion of the film printing system of FIG. 2A.

FIG. 2A shows a film printing system according to a first embodiment of the present invention. Film printing system 100 is substantially similar to prior art film printing system 10 but with the prior art printing head 40 being replaced by a DLP printing head 102 according to the present invention. Similar to printing head 40, printing head 102 receives light from the focusing optics at the output of the light box 20. FIG.

2B shows an enlarged view of printing head 102 and the light box 20. (As shown, light box 20 is a known device which, through the use of dichroic mirrors, reflectors, light valves or gates, and other optical components, is capable of regulating the relative output of additive color components, red, green, and blue. When used in contact printing, light box 20 is typically controlled to supply high quality full spectrum or white light.) The output of the light box 20 passes through an output lens 104 and is directed into a total internal reflection lens 106 (TIR lens) which is well known in the art as suitable for receiving light, directing the received light to a digital micromirror device (DMD), commonly referred to as digital light processor imager (DLP imager), and finally outputting the light according to an image signal of the DLP imager. In an alternative embodiment, the TIR lens 106 may be replaced by a field lens. Upon entering the TIR lens 106, light is reflected to an optical semiconductor of a suitable "single-chip" DLP imager 108 (having a resolution of approximately 2000×1000). However, it will be appreciated that alternative embodiments of the present invention may be substantially similar to film printing system 100, but comprising a "three-chip" DLP imager rather than the "single-chip" DLP imager. Providing a three-chip DLP imager would provide optimal performance and would eliminate any problems with so-called "rainbow effects" and/or time sequential color effects sometimes resulting from the use of a single-chip DLP imager.

Figure 1:
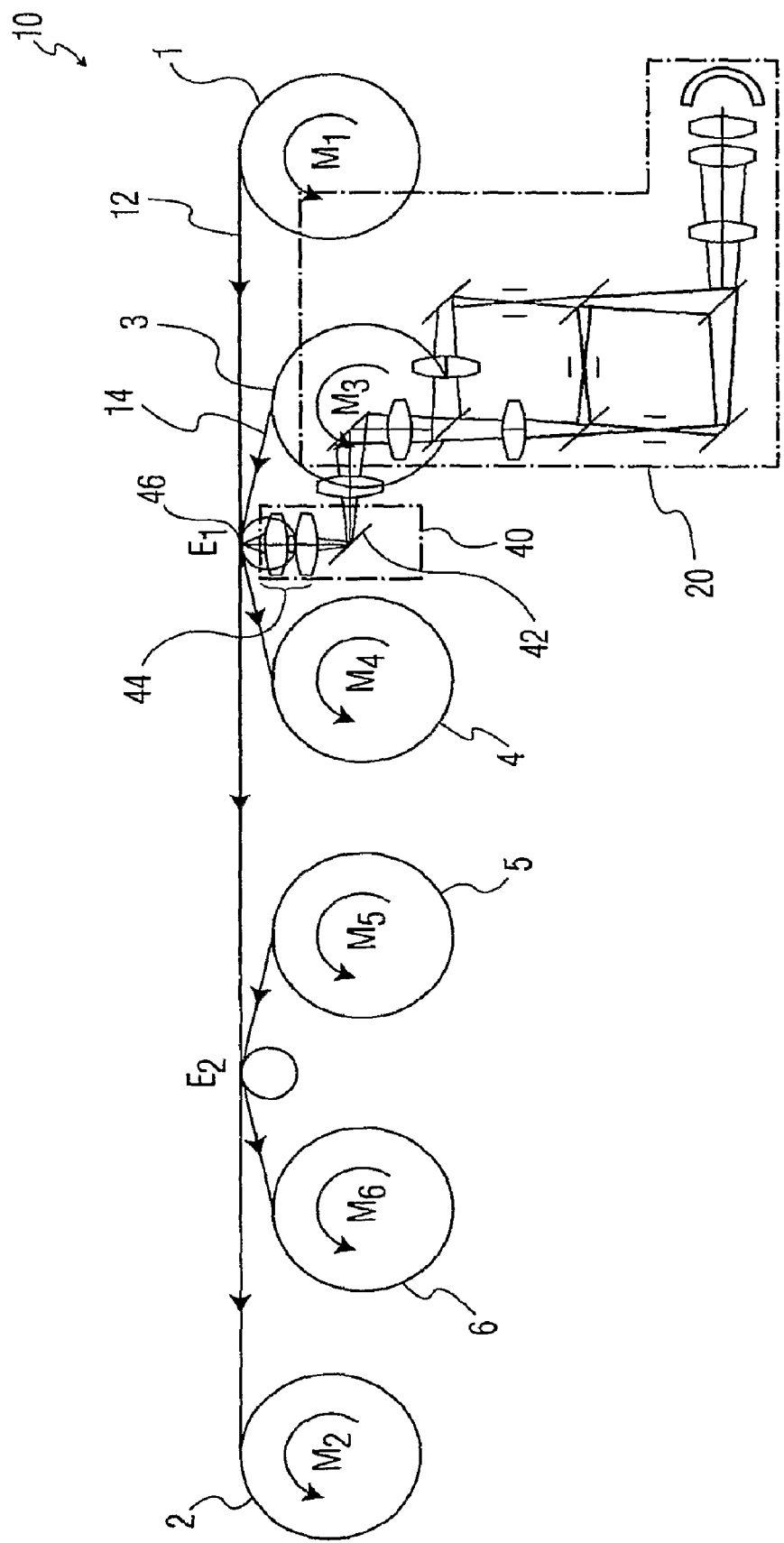
FIG. 1 is a schematic illustration of a known continuous contact film printing system.

DLP imagers are well known and comprise an optical semiconductor (not shown). The semiconductor (not shown) contains an array of hinge-mounted microscopic mirrors. Each of the mirrors corresponds to one pixel in an image (not shown) of the input signal. When the semiconductor (not shown) is driven by the controller based on the input signal, the mirrors are individually tilted or switched on or off to selectively reflect light either toward an output path of the TIR lens 106 or away from the output path of the TIR lens 106, possibly toward a light absorption device (not shown). An array of pixels reflected from the switched mirrors forms a projected light matrix corresponding to an input signal from a display controller. The display controller (not shown) of the present invention directs the mirrors to reflect light such that the light matrix carries appropriate pixel combinations for transmitting subtitles from the TIR lens 106 and into a system of telecentric optics 110 which replace the anamorphic optics 44 of FIG. 1. In order to provide selective coloring of the light matrix, it is well known that prior to reaching the minors of the DLP imager, the white light is passed through a so-called color wheel filter, causing red, green and blue light to be shone in sequence on the minors. The switching of the minors and the proportion of time the mirrors are 'on' or 'off' is coordinated according to the color shining on them such that the human visual system integrates the sequential color and sees a full-color image. All of the required color coordination is inherently present in the input signal from the display controller.

The telecentric optics 110 direct the projected light matrix through a film printing aperture 46, through a positive film (or master film) 14, and onto a raw stock of film 12 (negative film), effectively exposing the raw stock of film such that the negative carries the master film contents and subtitling.

Figure 3A:
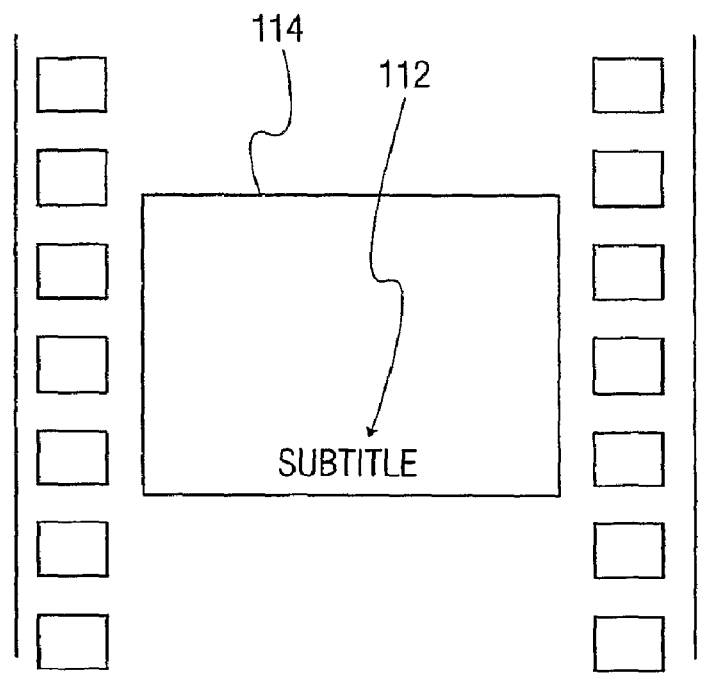
FIG. 3A is a front view of an example negative film frame output from the film printing system of FIG. 2.
Figure 3B:
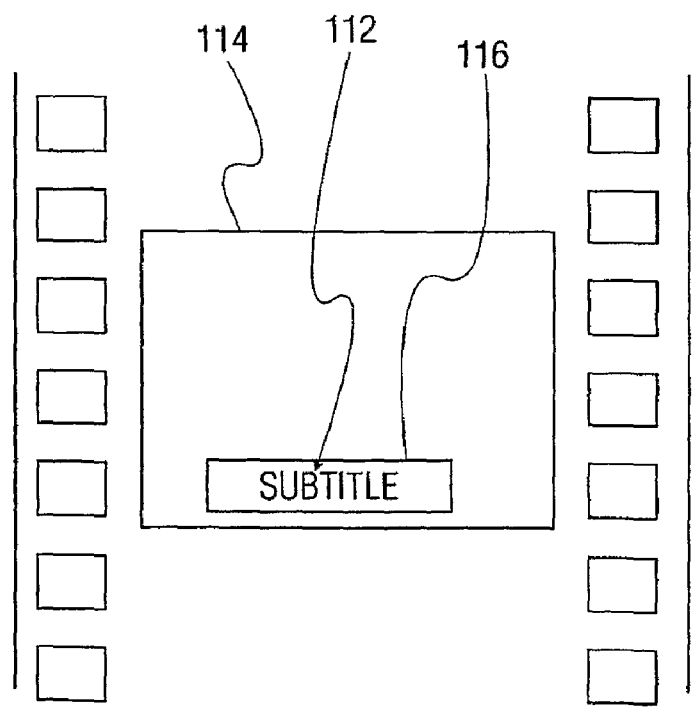
FIG. 3B is a front view of another example negative film frame output from the film printing system of FIG. 2.

Referring now to FIGS. 3A and 3B, the result of this process is the appearance of subtitling text 112 on the frames 114 of the newly exposed negative film 12. The text 112 corresponds to the input signal and can be written with a tombstone 116, a border surrounding the text (see FIG. 3B), or without a tombstone (see FIG. 3A). It will be appreciated that alternative embodiments of the present invention may include input signals from the display controller containing graphical content other than simple subtitling. For example, the input signal may include scrolling credits, titles, or any other shape or indicia capable of being transmitted to the DLP imager by the display controller.

Figure 4:
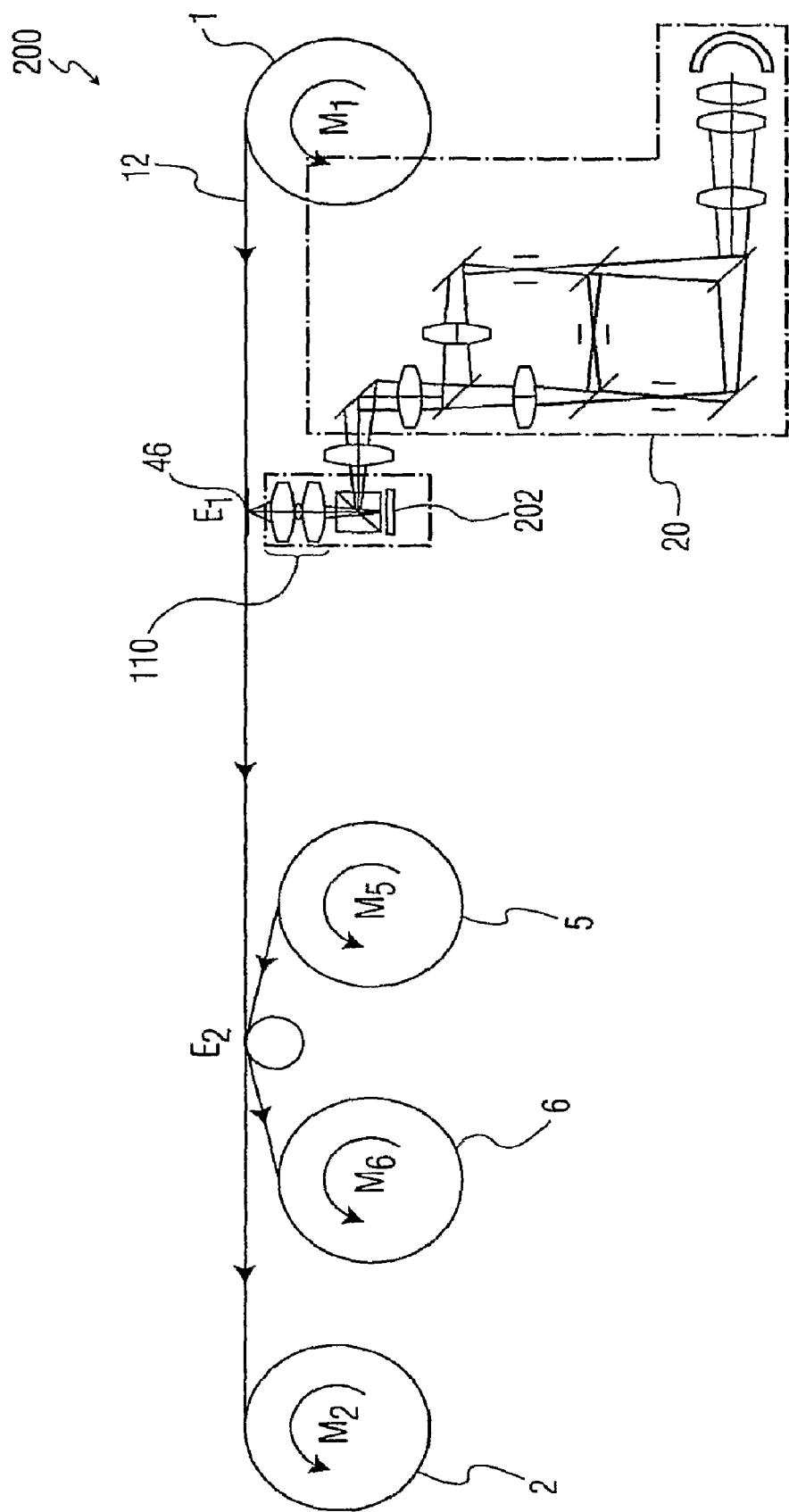
FIG. 4 is a schematic view of a printing system according to a second embodiment of the present invention.

Referring now to FIG. 4, a film printing system according to a second embodiment of the present invention is illustrated. While the single DLP imager 108 (having a resolution of approximately 2000×1000) of film printing system 100 described above is sufficient for creating acceptable subtitles, the resolution of DLP imager 108 is not sufficient for generating acceptable motion picture images over an entire image frame. Film printing system 200 is substantially similar to film printing system 100, but with a few major differences. A first difference is that the single-chip DLP imager 202 of film printing system 200 has a higher resolution than that of DLP imager 108. More specifically, the DLP imager 202 has a resolution of approximately 4000×2000 (not yet commercially available), which is considered a suitable resolution for accurately reproducing the motion picture images carried on a positive film (or master film). Due to this increased resolution, the printing process associated with film printing system 100 may be simplified. Namely, film printing system 200 provides for printing motion picture images and optional subtitling (or any other graphics) directly onto a film negative 12 without the use of a positive or master film 14. Since a positive or master film 14 is not used in system 200, there is no need for reels 3,4 and motors $M_3$, $M_4$, therefore, they are not represented in FIG. 4. Operation of film printing system 200 is similar to operation of film printing system 100, but in film printing system 200, no positive or master film is used. Rather, the input signal of DLP imager 202 transmitted to the mirrors (not shown) of DLP imager 202 by the display controller of DLP imager 202 (not shown) contains all image data related to both the motion picture and any subtitling and/or other optional graphics. It will be appreciated that alternative embodiments of the present invention may be substantially similar to film printing system 200, but comprising a "three-chip" DLP imager rather than the "single-chip" DLP imager. Providing a three-chip DLP imager would provide optimal performance and would eliminate any problems with so-called "rainbow effects" and/or time sequential color effects sometimes resulting from the use of a single-chip DLP imager.

Figure 5:
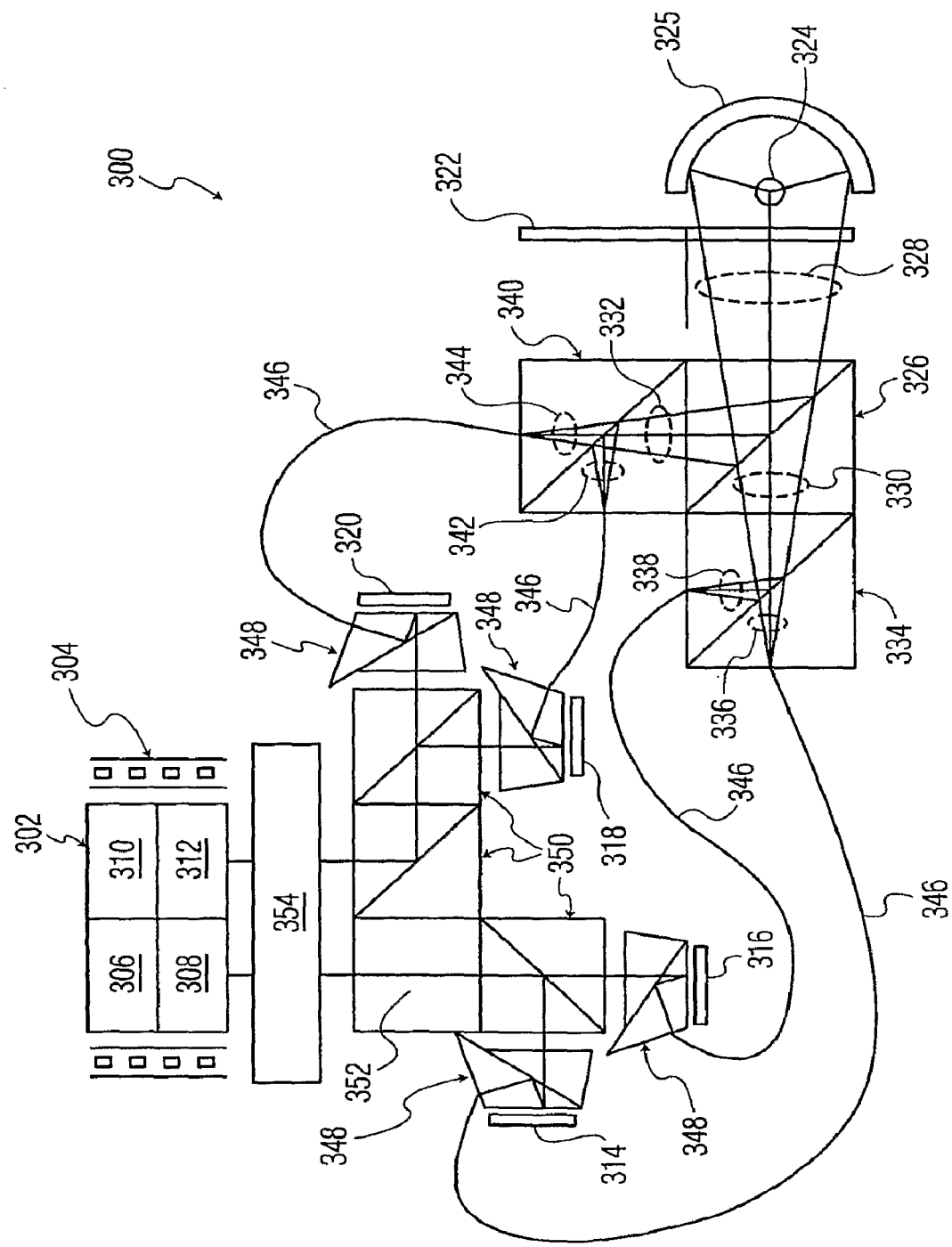
FIG. 5 is a schematic view of a printing system according to a third embodiment of the present invention.

Referring now to FIG. 5, a film printing system according to a third embodiment of the present invention is illustrated. It is currently thought that a DLP imager having resolution of about 2000×1000 is insufficient for accurately reproducing an entire frame of motion picture image data onto a negative film frame, thereby eliminating DLP imagers with resolution of about 2000×1000 from use as an accepted means for directly printing onto negative film frames without the use of a positive or master film. However, film printing system 300 advantageously utilizes a plurality of commercially available DLP imagers (having resolution of about 2000×1000) to accomplish a result similar to that of film printing system 200 where negative film frames are exposed with images solely emanating from DLP imagers, without the use of positive or master film. To accomplish this, the entire frame 302 of a target negative film 304 is divided into four regions, an upper left region 306, a lower left region 308, an upper right region 310, and a lower right region 312. Region 306 is to be directly printed onto by DLP imager 314, region 308 is to be directly printed onto by DLP imager 316, region 310 is to be directly printed onto by DLP imager 318, and region 312 is to be directly printed onto by DLP imager 320. Each DLP imager 314, 316, 318, and 320 is substantially similar to DLP imager 108, but instead of each DLP imager 314, 316, 318, and 320 having a color wheel filter, a single color wheel filter 322 is used. In operation, white light or full spectrum light is emitted from a light source 324 and is directed through the spinning color wheel filter 322, possibly with guidance from an elliptical reflector 325. Since each DLP imager 314, 316, 318, and 320 must be supplied with light, the light exiting the spinning color wheel filter 322 is separated into four channels of light (ideally identical in intensity and color) through the use of light beam splitting prisms. A first light beam splitting prism 326 splits the original light beam 328 into two new light beams 330 and 332. Light beam 330 is directed from prism 326 into a second light beam splitting prism 334, resulting in light beams 336 and 338. Light beam 332 is directed from prism 326 into a third light beam splitting prism 340, resulting in light beams 342 and 344. Each of light beams 336, 338, 342, and 344 are directed into and delivered through optical fibers 346 to TIR lenses 348 associated with DLP imagers 314, 316, 318, and 320, respectively. TIR lenses 348 operate in substantially the same manner as TIR lens 106 with respect to delivering light from fibers 346 to DLP imagers 314, 316, 318, and 320. However, TIR lenses 348 are oriented to direct their output into an arrangement of reflective prisms 350 and optical blocks 352 so as to forward the four light beams 336, 338, 342, and 344 (or channels of light) (as altered by DLP imagers 314, 316, 318, and 320) into a telecentric optics system 354. Telecentric optics system 354 ultimately directs the light beams 336, 338, 342, and 344 onto regions 306, 308, 310, and 312, respectively, of the entire frame 302 of a target negative film 304. Of course, the input signals sent from display controllers of DLP imagers 314, 316, 318, and 320 to the mirrors of the respective DLP imagers comprise only the data necessary to create the desired image to be printed in the associated regions of frame 302. In an alternative embodiment, telecentric optics system 354 could be replaced by a projection optics system and the resulting output could be a projected image on a reflective screen or other surface, allowing for real-time superimposing of subtitles and/or other graphics in the projected image. It will be appreciated that in other embodiments of the present invention, more or fewer DLP imagers may be incorporated to achieve a higher or lower overall film frame resolution, respectively.

Figure 6:
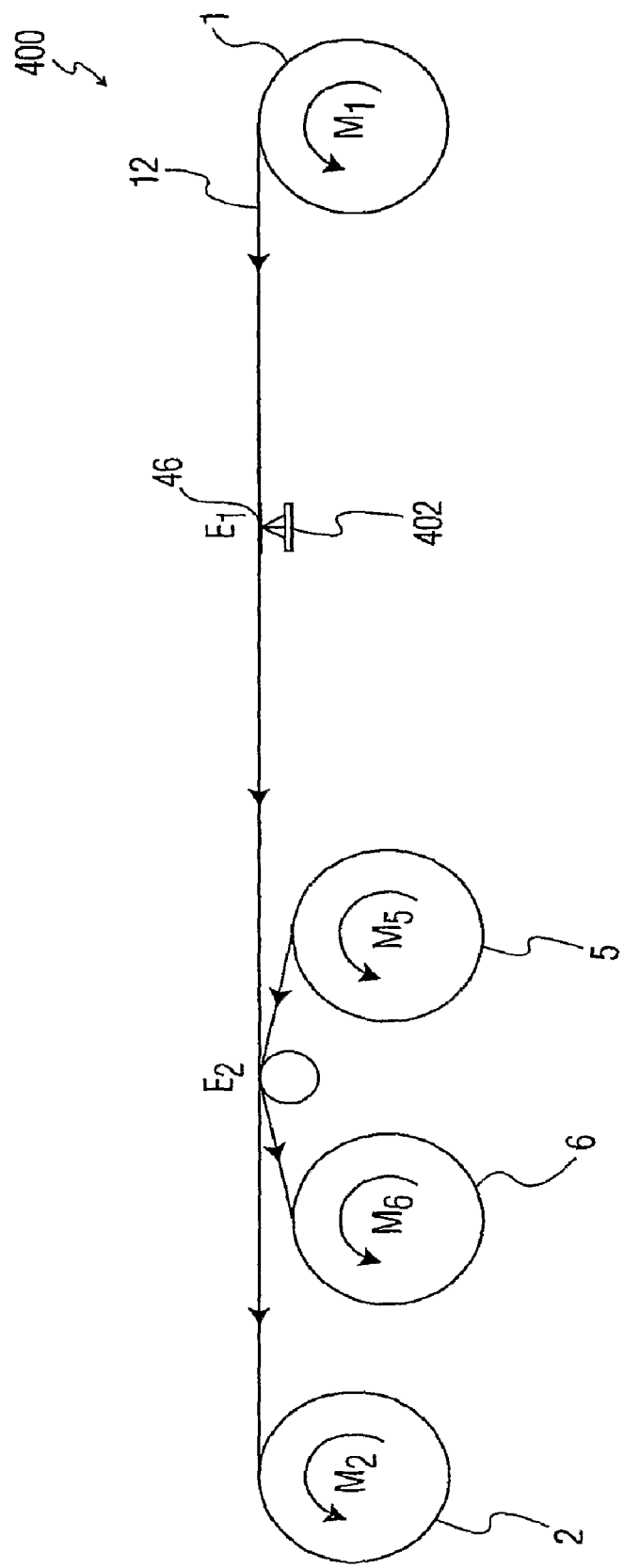
FIG. 6 is a schematic view of a printing system according to a fourth embodiment of the present invention.

Referring now to FIG. 6, a film printing system according to a fourth embodiment of the present invention is illustrated. Film printing system 400 is substantially similar to film printing system 200, but with a few major differences. First, film printing system 400 incorporates an organic light emitting diode display device 402 (an OLED) rather than a DLP imager such as DLP imager 108 as a means for generating subtitles and/or motion picture image data. Second, since OLED devices inherently actively emit illumination, there is no need for a light box 20 to provide white light for subsequent filtering and reflection as needed by DLP imagers. Since a positive or master film 14 is not used in system 200, there is no need for reels 3,4 and motors $M_3$, $M_4$, therefore, they are not represented in FIG. 6. Finally, as the OLED device 402 is capable of emitting light from a substantially constant distance from a film printing aperture 46, there is no need for expensive and sizable telecentric optics such as telecentric optics system 354.

Figure 7:
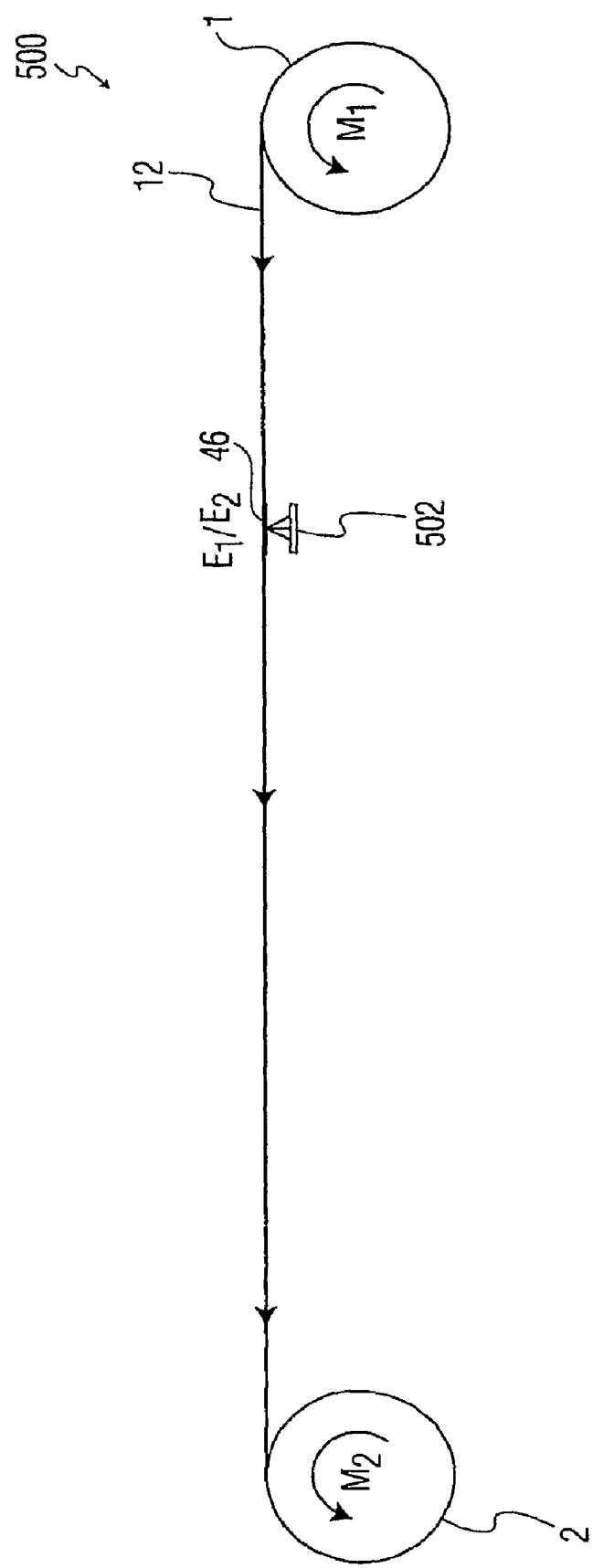
FIG. 7 is a schematic view of a printing system according to a fifth embodiment of the present invention.

Referring now to FIG. 7, a film printing system according to a fifth embodiment of the present invention is illustrated. Film printing system 500 is substantially similar to film printing system 400, but with a few major differences. In film printing system 500, an OLED device 502 is provided with the necessary data for displaying and projecting onto negative 12 the entire frame image, including the sound information. Now, OLED device 502 alone can optically transfer all of the contents to negative 12 which are necessary for producing a finished negative 12. Furthermore, since sound is now transferred to the negative by OLED device 502, there is no need for a separately located sound encoder $E_2$, but rather, the OLED device 502 serves as both the picture encoder $E_1$ and the sound encoder $E_2$. Consequently, there is no need for reels 5, 6 and motors $M_5$, $M_6$, therefore, they are not represented in FIG. 7. A major advantage of printing sound and video at the same time is that sound and video synchronization is accomplished.

Figure 8:
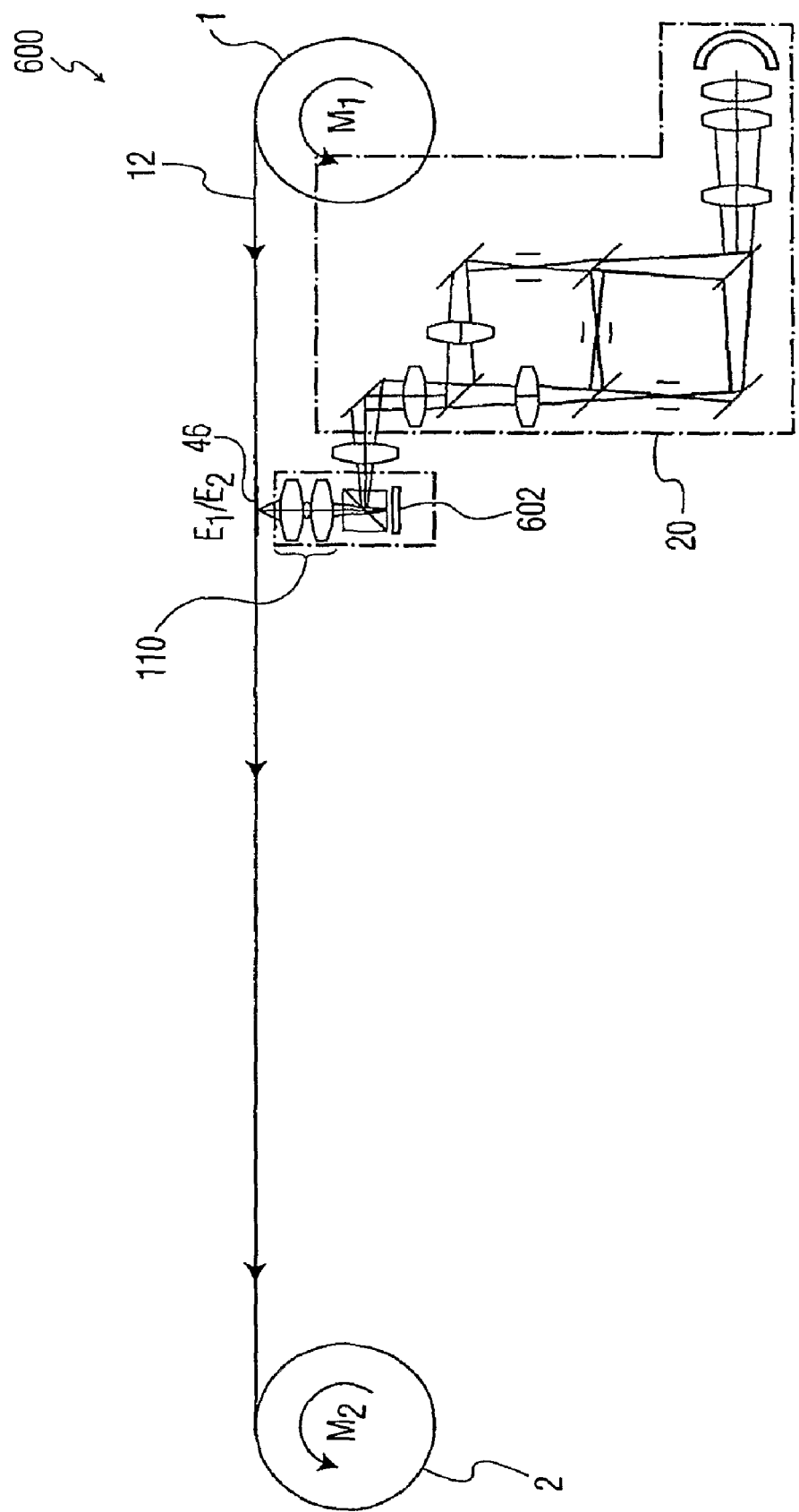
FIG. 8 is a schematic view of a printing system according to a sixth embodiment of the present invention.

Referring now to FIG. 8, a film printing system according to a sixth embodiment of the present invention is illustrated. Film printing system 600 is substantially similar to film printing system 500, but with a few major differences. In film printing system 600, a three-chip DLP imager 602 (instead of an OLED device 502) is provided with the necessary data for displaying and projecting onto negative 12 the entire frame image, including the sound information. Now, DLP imager 602 alone can optically transfer all of the contents to negative 12 which are necessary for producing a finished negative 12. Furthermore, since sound is now transferred to the negative by DLP imager 602, there is no need for a separately located sound encoder $E_2$, but rather, the DLP imager 602 serves as both the picture encoder $E_1$ and the sound encoder $E_2$. Consequently, there is no need for reels 5, 6 and motors $M_5$, $M_6$, therefore, they are not represented in FIG. 8. Another difference between system 600 and system 500 is that since a DLP imager is being utilized, light box 20 is needed and is therefore represented in FIG. 8. A major advantage of printing sound and video at the same time is that sound and video synchronization is accomplished.

The foregoing illustrates only some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

The invention claimed is:

1. A film printing system, the film printing system comprising:
   a light box for generating and emitting light;
   a printing head for printing motion images and subtitles onto a raw stock of film negative, having a digital micromirror device configured to receive and selectively manipulate the light emitted by the light box and configured to reflect the manipulated light through a film printing aperture of the printing head, and wherein the digital micromirror device configured to receive and selectively manipulate the light emitted by the light box and configured to reflect the manipulated light through a film printing aperture of the printing head onto the raw stock of film negative;
   a TIR lens optically disposed between the light box and the digital micromirror device and also optically disposed between the digital micromirror device and the film printing aperture;
   a telecentric optics system optically disposed between the TIR lens and the film printing aperture; and
   a display controller for driving the digital micromirror device such that, in response to an input signal carrying subtitle data, the digital micromirror device manipulates light emitted by the light box to carry subtitles, and wherein the digital micromirror device, in response to an input signal, manipulates light to carry subtitle data and manipulates light to carry a full frame of motion picture image data, further comprising, a light beam splitter for splitting the light emitted from the light box into a plurality of separate beams of light;

a plurality of digital micromirror devices, each adapted to receive a single beam of light of the plurality of separate beams of light; wherein each of the digital micromirror devices is adapted to manipulate a received beam of light to carry motion picture image data corresponding to only a discrete portion of an entire image frame.

* * * * *